United States Patent [19]

Venkitakrishnan et al.

[11] Patent Number: 4,718,057

[45] Date of Patent: Jan. 5, 1988

[54] STREAMLINED DIGITAL SIGNAL PROCESSOR

[75] Inventors: P. Venkitakrishnan; Gururaj Singh, both of Sunnyvale; Ronald C. Laugesen, Los Gatos, all of Calif.

[73] Assignee: Advanced Micro Devices, Inc., Sunnyvale, Calif.

[21] Appl. No.: 771,339

[22] Filed: Aug. 30, 1985

[51] Int. Cl.$^4$ .................... H04J 1/10; H04J 3/02
[52] U.S. Cl. ........................... 370/55; 370/85
[58] Field of Search ............. 370/85, 88, 110.1, 62, 370/55; 340/825.5

[56] References Cited

U.S. PATENT DOCUMENTS

| | | | |
|---|---|---|---|
| 4,530,093 | 7/1985 | Akram et al. | 370/85 |
| 4,551,721 | 11/1985 | Kozlik | 370/85 |
| 4,564,938 | 1/1986 | Boot | 370/85 |
| 4,608,685 | 8/1986 | Jain et al. | 370/85 |

Primary Examiner—Douglas W. Olms
Assistant Examiner—Frank M. Scutch, III
Attorney, Agent, or Firm—Patrick T. King; Kenneth B. Salomon

[57] ABSTRACT

An all-digital signal processor (DSP) is disclosed which performs pulse code modulation (PCM) coding and decoding (CODEC) filter operations for both received and transmitted signals, among other functions. A user can access various programmable registers via the microprocessor to specify parameters used in the execution of programs by the DSP. Two 19-bit wide bidirectional data busses are provided for time-division multiplexed communication between various elements, which include a random access memory (RAM), an arithmetic-logic unit (ALU), and an interface to a receive-side analog-to-digital (A/D) converter and a transmit-side digital-to-analog (D/A) converter. A programmed logic array (PLA) executes microcode which controls the processing of signals by the ALU section. A variety of other operations can be performed under control of the PLA such as generation of dual-tone multi-frequency (DTMF) signals commonly used in telecommunications. The architecture of the DSP provides a number of user-accessible registers for the storage of parameters and coefficients used in the generation of the DTMF signals, in the CODEC filtering, and in the compression and expansion of signals. The design of the general-purpose DSP is readily expandible to accomodate additional circuit elements and/or more signals to be processed in parallel.

9 Claims, 11 Drawing Figures

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| N | N | N | ST | ST | ST | ST | ST | GR | GR | GR | GR | GR | GR | GR | GR |
| GER | GER | GER | GER | GER | GER | GER | N | 140' | 140' | 140' | 140' | 141' | D2 | D2 | D2 |
| D3 | D3 | D3 | D4 | D4 | D4 | D4 | D4 | D4 | LPX | LPX | LPX | LPX | LPX | LPX | LPX |
| LPX | 110 | 110 | 110 | 110 | 110 | 120 | 120 | 130 | 130 | 140 | 140 | 141 | LPX | LPX | LPX |
| LPX | LPX | LPX | LPX | LPX | LPX | LPX | LPX | LPX | LPX | LPX | LPX | LPX | LPX | LPX | TR |
| TR | TR | TR | TR | TR | TR | TR | N | 140' | 140' | 140' | 140' | 141' | D2 | D2 | D2 |
| N | N | N | N | N | N | N | N | DT | DT | DT | DT | DT | DT | DT | DT |
| DT | DT | DT | DT | DT | DT | DT | DT | 130 | 130 | 140 | 140 | 141 | R | R | R |
| R | R | R | R | R | R | R | R | R | R | R | R | R | R | R | R |
| R | R | R | R | R | R | R | R | 140' | 140' | 140' | 140' | 141' | D2 | D2 | D2 |
| D3 | D3 | D3 | R | R | R | R | R | R | R | R | R | R | R | R | N |
| N | N | N | 111 | 111 | 111 | 120 | 120 | 130 | 130 | 140 | 140 | 141 | LPR | LPR | LPR |
| LPR | LPR | LPR | LPR | LPR | LPR | LPR | LPR | LPR | LPR | LPR | LPR | LPR | LPR | LPR | LPR |
| LPR | LPR | LPR | LPR | LPR | LPR | LPR | LPR | 140' | 140' | 140' | 140' | 141' | D2 | D2 | D2 |
| TM | TM | TM | TM | TM | TM | TM | TM | DT | DT | DT | DT | DT | DT | DT | DT |
| DT | DT | DT | DT | DT | DT | DT | DT | 130 | 130 | 140 | 140 | 141 | N | N | N |
| N | HP2 | HP2 | HP2 | HP2 | HP2 | HP2 | HP2 | HP2 | HP2 | HP2 | HP2 | HP2 | HP2 | HP2 | HP2 |
| HP2 | AZ | AZ | AZ | AZ | AZ | AZ | AZ | 140' | 140' | 140' | 140' | 141' | D2 | D2 | D2 |
| D3 | D3 | D3 | D4 | D4 | D4 | D4 | D4 | D4 | LPX | LPX | LPX | LPX | LPX | LPX | LPX |
| LPX | 110 | 110 | 110 | 110 | 110 | 120 | 120 | 130 | 130 | 140 | 140 | 141 | LPX | LPX | LPX |
| LPX | LPX | LPX | LPX | LPX | LPX | LPX | LPX | LPX | LPX | LPX | LPX | LPX | LPX | LPX | HP1 |
| HP1 | HP1 | HP1 | HP1 | HP1 | HP1 | HP1 | N | 140' | 140' | 140' | 140' | 141' | D2 | D2 | D2 |
| N | N | N | N | N | N | N | N | DT | DT | DT | DT | DT | DT | DT | DT |
| DT | DT | DT | DT | DT | DT | DT | DT | 130 | 130 | 140 | 140 | 141 | X | X | X |
| X | X | X | X | X | X | X | X | X | X | X | X | X | X | X | X |
| X | X | X | X | X | X | X | X | 140' | 140' | 140' | 140' | 141' | D2 | D2 | D2 |
| D3 | D3 | D3 | X | X | X | X | X | X | X | X | X | X | X | GX | GX |
| GX | GX | GX | 111 | 111 | 111 | 120 | 120 | 130 | 130 | 140 | 140 | 141 | LPR | LPR | LPR |
| LPR | LPR | LPR | LPR | LPR | LPR | LPR | LPR | LPR | LPR | LPR | LPR | LPR | LPR | LPR | LPR |
| LPR | LPR | LPR | LPR | LPR | LPR | LPR | LPR | 140' | 140' | 140' | 140' | 141' | D2 | D2 | D2 |
| OUT | OUT | OUT | OUT | OUT | OUT | OUT | OUT | DT | DT | DT | DT | DT | DT | DT | DT |
| DT | DT | DT | DT | DT | DT | DT | DT | 130 | 130 | 140 | 140 | 141 | N | N | N |
| 497 | 498 | 499 | 500 | 501 | 502 | 503 | 504 | 505 | 506 | 507 | 508 | 509 | 510 | 511 | 512 |

STREAMLINED DIGITAL SIGNAL PROCESSOR

This invention relates to telecommunication equipment and, more particularly, to a general-purpose digital processor which performs a variety of signal processing functions for both the receive and transmit sides of an audio processor section of a digital subscriber controller.

CROSS-REFERENCE TO RELATED COPENDING APPLICATIONS

Related copending application of particular interest to the instant application are application Ser. No. 759,622, filed July 26, 1985, entitled "Digital Subscriber Controller"; application Ser. No. 759,624, filed July 26, 1985, entitled "Data Routing Programmable Multiplexer"; application Ser. No. 771,382, filed Aug. 30, 1985, entitled "Tone Generation for Telecommunications"; and application Ser. No. 771,387, filed Aug. 30, 1985, entitled "Bit-Sliced, Dual-Bus Design of Integrated Circuits", all assigned to the assignee of the instant application. These four related, co-pending applications are hereby incorporated by reference.

BACKGROUND OF THE INVENTION

Telephonic subscriber lines today are increasingly employing all-digital networks for both voice and data transmission so as to provide the utmost in signal integrity and flexibility inherent in digital networks. Further benefits accorded to the subscriber include the more efficient provision of existing and new services, such as telephony, packet- and circuit-switched data, telemetry, electronic mail, alarm signaling, telex, facsimile, and banking transactions over the same medium, thereby greatly reducing equipment and space requirements. Additionally, benefits accrue to the telephone company in terms of increased revenue derived from the provision of these new services, and simplified management resulting from all services operating on a single (digital) network.

To provide an interface to such all-digital voice/data networks on the subscriber's premises, the prior art has employed discrete and/or expensive custom circuitry which lacks the flexibility to meet changing subscriber needs. Furthermore such circuitry encourages proliferation of incompatible implementations which vary in physical, electrical and line protocol characteristics. Additionally, the prior art interfaces occupy large amounts of space, have high power consumption thereby generating considerable heat which requires cooling apparatus and lack the reliability of monolithic integrated circuitry.

Specifically, the audio signal processing circuitry of prior art interfaces was complex and typically required two separate digital signal processors, one for the traumatic section another for the receive section. Representative of such apparatus is that disclosed in the patent application PCT/US80/00753 entitled "Interpolative Analog-to-Digital Converter for Subscriber Line Audio Processing Circuit Apparatus" filed June 18, 1980 on behalf of R. J. Apfel, A. G. Eriksson and L. T. E. Svensson, involving considerable custom-designed logic circuitry in the signal processing and control sections.

Furthermore, prior art apparatus was typically hybrid digital/analog such as that disclosed in U.S. Pat. No. 4,061,886 to Callahan, Jr. et al. A digital-to-analog (D/A) ladder network converts digitally coded signals to analog sine waves and an analog operational amplifier is used to combine the sinusoidal waveforms to provide a dual-tone output signal. The use of D/A ladder circuitry unnecessarily complicates the disclosed apparatus and introduces undesirable imperfections in the signals generated. Also, the waveforms generated are selectable from only a limited hard-wired number of frequencies and amplitudes and cannot be changed without extensive modification of the circuitry.

More importantly, the hybrid apparatus requires circuitry dedicated to the generation of tones, a relatively simple operation for a digital microprocessor to perform. Such digital processors are usually already present within telecommunication equipment and could be used for tone generation without the need for elaborate dedicated circuitry, provided an all-digital technique were available with which to generate dual-tone multifrequency waveforms with the requisite accuracy.

SUMMARY OF THE INVENTION

An all-digital signal processor (DSP) is disclosed which performs pulse code modulation (PCM) coding and decoding (CODEC) filter operations for both received and transmitted signals, among other functions. The DSP is particularly suited for use in the main audio processor (MAP) of an integrated services digital network (ISDN) terminal equipment controller which interfaces with an external microprocessor. A user can access various programmable registers via the microprocessor to specify parameters used in the execution of program by the DSP of the instant invention.

The DSP contains two 19-bit wide data busses for communication between its various elements, which include a random access memory (RAM), an arithmetic-logic unit (ALU), and an interface to a receive-side analog-to-digital (A/D) converter and a transmit-side digital-to-analog (D/A) converter. A programmed logic array (PLA) executes microcode which controls the processing of signals by the ALU section. A variety of other operations can be performed under control of the PLA such as generation of dual-tone multi-frequency (DTMF) signals commonly used in telecommunications.

The architecture of the DSP provides a number of user-accessible registers for the storage of parameters and coefficients used in the generation of the DTMF signals, in the CODEC filtering, and in the compression and expansion of signals.

A single general-purpose DSP of the present invention serves to process signals on both the receive- and transmit-sides and as it is of a purely digital nature requires little support circuitry dedicated to particular functions. The design of the general-purpose DSP follows a structured methodolgy which avoids special-case circuit solutions and critical timing paths.

An exemplary application of the DSP in the generation of DTMF, tone ringer and tone message signals illustrates the advantages of the DSP of the instant invention over the prior art.

BRIEF DESCRIPTION OF THE DRAWINGS

FIG. 5B indicates the timing signals used by the DSP of the instant invention to control execution of the microcoded filter and tone generation routines;

DETAILED DESCRIPTION OF THE PREFERRED EMBODIMENT

A. DSC Architecture

Figure 1:
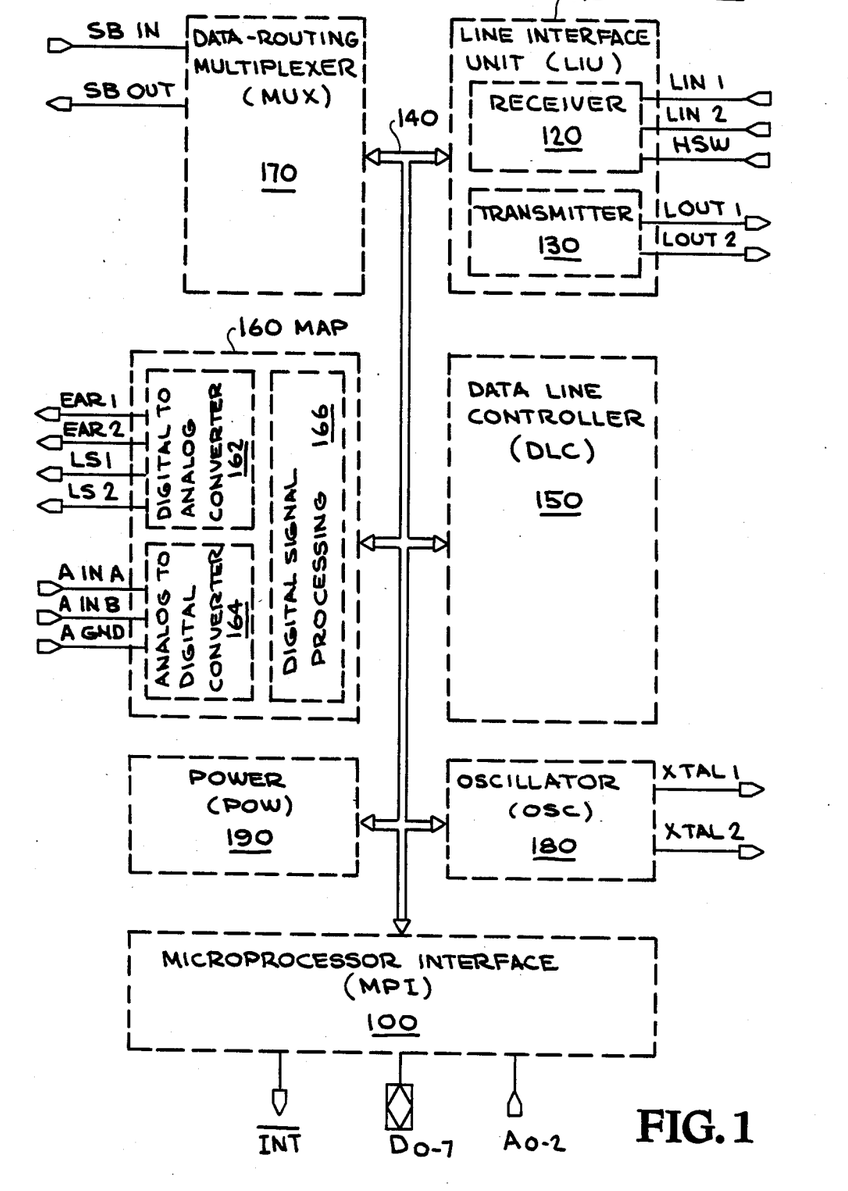
FIG. 1 is a functional block diagram of a digital subscriber controller (DSC) employing a digital signal processor (DSP) of the instant invention within its main audio processor (MAP) section.

The main audio processor (MAP) 160 of the present invention is shown in an exemplary application within a digital subscriber controller (DSC) 34 consisting of seven functional blocks, as illustrated in FIG. 1. The DSC provides digital subscriber access to a telephone network. The DSC is compatible with the CCITT I-series recommendations at reference point "S". Accordingly, the user of the DSC according to the present invention may utilize it in terminal equipment (TE) which conforms to international standards.

The DSC 34 is the subject of a related co-pending application Ser. No. 759,622, filed July 26, 1985, on behalf of Alan T. Clark, et al., entitled "Digital Subscriber Controller", and assigned to the assignee of the instant application. A detailed description of the DSC 34 of FIG. 1, other than the programmable multiplexer and the main audio processor, shown thereon as MUX 170 and MAP 160, respectively, is contained in the above-referenced co-pending application. The MUX 170 is the subject of a related co-pending application Ser. No. 759,624, filed July 26, 1985, on behalf of Alan T. Clark, et al., entitled "Data Routing Programmable Multiplexer", and assigned to the assignee of the instant application. A detailed description of MUX 170 and related elements within MUX 170 is contained in the latter co-pending application. These two related, co-pending applications are hereby incorporated by reference.

With reference to FIG. 1, DSC 34 provides a 192 kilo-bit per second (kbs) full-duplex digital path for bit-streams received via an isolation transformer (not shown) on a four-wire "S" interface at terminals LIN1 and LIN2, and transmitted on the four-wire interface from terminals LOUT1 and LOUT2. The DSC separates the received bit-stream into B1 and B2 channels (each 64 kbs), and a D channel (16 kbs). The B channels are routed to different ones of the functional blocks illustrated in FIG. 1 under user control via the multiplexer 170. The D-channel is partially processed at the Level 2 in the DSC 34 and passed via a microprocessor interface (MPI) 100 to a programmable microprocessor (MPC, not shown) for additional processing. The DSC 34 of the present invention supports both of the two major CCITT recommendations, "point-to-point" and "point-to-multipoint" (passive bus) subscriber configurations, to meet both PBX and public applications.

With reference to FIG. 1, the DSC 34 includes a line interface unit (LIU) 110, connected to the terminals LIN1 and LIN2, which contains a receiver section 120 and a transmitter section 130. The receiver section 120 consists of a receiver filter, a digital phase-lock loop (DPLL) for clock recovery, two slicers for detecting high marks and low marks of the incoming bit-stream frames, and a frame recovery circuit for frame synchronization.

Receiver 120 converts the incoming pseudo-ternary encoded bit stream into binary before conducting it to the other blocks of the DSC 34, illustrated in FIG. 1, via a bus 140. The receiver 110 also performs D-channel access protocol to resolve potential contention when the DSC 34 is operating in the "point-to-multipoint" configuration.

The transmitter section 130 consists of a binary-to-pseudo-ternary encoder and a line driver which receives signals on the bus 140 and causes an outgoing bit stream to be generated therefrom at the LOUT1 and LOUT2 terminals of the DSC 34. This outgoing bit stream is as specified in the CCITT recommendations for the "S" interface.

The LIU 110 conforms to the CCITT recommendations for level 1 activation and deactivation on the "S" interface. This is achieved by transmitting, and decoding, the standard CCITT "Info" signals. The LIU 110 is also responsive to a signal on a hook switch (HSW) terminal of the DSC 34. The HSW terminal receives a signal indicative of the off-hook or on-hook condition of a handset connected to the DSC.

The DSC 34 also includes a data link controller (DLC) 150 connected to the bus 140 which partially processes the 16 kbs D-channel received via the LIU 110. The partial processing of the layer 2 of the protocol includes flag detection and generation, zero deletion and insertion, frame check sequence processing for error detection, and some addressing capability. The external microprocessor initializes the DLC 150 and performs higher level protocol processing. When the DSC 34 is in the receive mode, D-channel data is conducted from the LIU 110 to the DLC 150, via bus 140, and then to the microprocessor interface (MPI) 100 for transmission from a set of eight data terminals (D0, D1, D2, D3, D4, D5, D6, and D7) of the DSC 34 to the external microprocessor. When the DSC is in the transmit mode, D-channel data is conducted from MPI 100 to the LIU 110 via DLC 150 for transmission on the D-channel over the "S" interface.

A main audio processor (MAP) 160 contained within the DSC 34 performs digital-to-analog (D/A) conversion within a D/A section 162 and analog-to-digital (A/D) conversion within an A/D section 164 and digital processing of the signals present in the DSC 34 in a digital signal processing (DSP) section 166. Analog audio signals can be applied to MAP portion of the DSC 34 at two general analog inputs (AINA, AINB, AGND) and analog voice signals are generated by the MAP Portion at earphone terminals (EAR[1] and EAR[2]) and at loudspeaker terminals (LS1 and LS2).

The MAP 160 of the instant invention contains three user-programmable features which are accessible to the user at the MAP terminals. The first is a multi-tone generator section of the present invention; the second is a pair of attenuation distortion correction filters, and the third is a pair of gain adjustment filters. The MAP 160 transmits and receives digital signals on the bus 140 carrying digital representations of audio signals received at the AINA, or AINB terminal or to be generated at the EAR1 and EAR2 terminals or at the LS1 and LS2 terminals, respectively.

A multiplexer (MUX) 170 portion of the DSC 34 is externally programmable via the external microprocessor and, in response, controls the multiplexed bitstreams on the B1 and B2 channels which are received and transmitted to external peripheral devices from the DSC 34 at a serial-B input (SBIN) terminal of the DSC 34 and a serial-B output (SBOUT) terminal of the DSC 34, respectively. The MUX 170 can be programmed to establish a variety of different signal paths via the bus 140 having source and destinations, including: the SBIN terminals the SBOUT terminal, the MPI 100, the LIU 110, and the MAP 160. The MUX 170 of FIG. 1 selectively routes the 64 kbs B1 and B2 channels among the MPI 100, the LIU 110, and the MAP 160, with internal logical channels designated thereon as Ba (for the MAP), Bb and Bc (for the MPI), Bd, Be and Bf (for the B-serial port), and B1 and B2 (for the LIU). The D-channel data is routed to the DLC 150 directly from the LIU 110.

B. DSC Programmable Internal Bus Structure

The MUX 170 contains four multiplexer control registers (MCR1, MCR2, MCR3 and MCR4), which can be programmed via the MPI 100 to direct data flow along subscriber selected bidirectional data paths shown functionally in FIG. 1 as bus 140.

B.1 Logical Bus Structure

Figure 2:
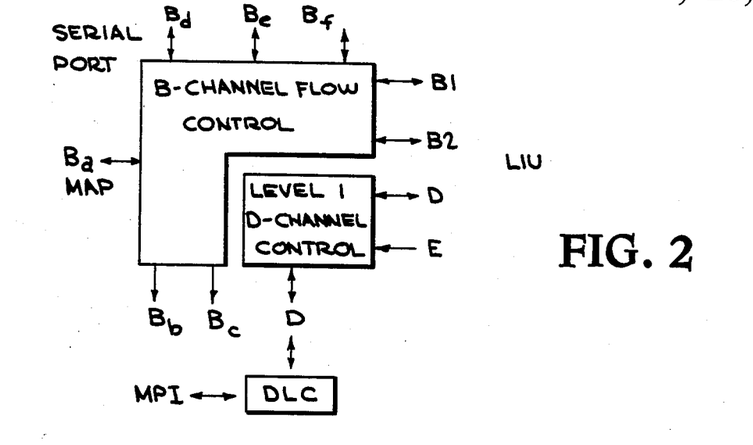
FIG. 2 illustrates the logical data bus structure internal to the DSC.

The MUX 170 can establish those bidirectional paths between the eight MUX logical parts B1, B2, Ba, Bb, Bc, Bd, Be, and Bf, shown in FIG. 2, as controlled by the contents of MCR1, MCR2, and MCR3. These MCRs are externally programmed to connect any two of the eight logical B-channel ports together by writing an appropriate channel code into the corresponding MCR. Each of the MCR1, MCR2, and MCR3 receives a pair of four-bit channel codes, which, in accordance with Table I, below, specifies the logical channel interconnections.

For instance, the assignment to MCR1 of the channel codes 0001 and 0100 would establish a bidirectional channel connection of B1 and Bb. A loopback connection can be established by assigning the same pair of channel codes to a particular MCR.

TABLE I

| MCR1, MCR2, and MCR3 Channel Codes | |
|---|---|
| Code | Channel |
| 0000 | No connection |
| 0001 | B1 (LIU) |
| 0010 | B2 (LIU) |
| 0011 | Ba (MAP) |
| 0100 | Bb (MPI) |
| 0101 | Bc (MPI) |
| 0110 | Bd (Serial B Port Channel 1) |
| 0111 | Be (Serial B Port Channel 2) |
| 1000 | Bf (Serial B Port Channel 3) |

The MUX 170 is the subject of a related co-pending application Ser. No. 759,624, filed July 26, 1985, on behalf of Alan T. Clark, et al., entitled "Programmable Multiplexer", and assigned to the assignee of the instant application. A detailed description of the MUX 170 and the multiplexer control registers and related elements within the MUX 170 is contained in that related co-pending application and is incorporated herein by reference.

B.2 Internal Physical Bus Structure

Figure 3:
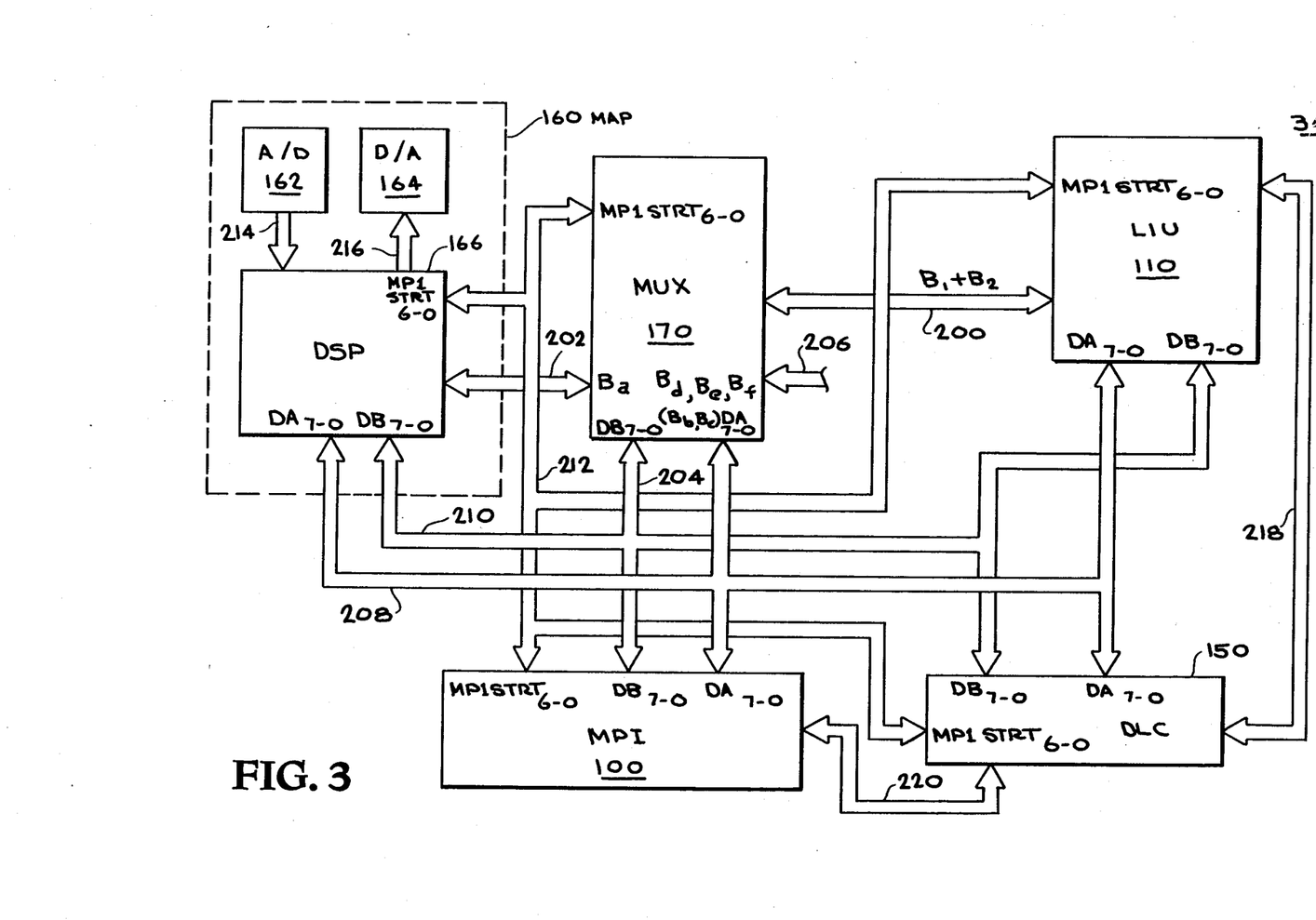
FIG. 3 illustrates the physical data bus structure of the DSC.

The bus structure internal to the DSC 34, shown functionally as bus 140 on FIG. 1 is illustrated in FIG. 3. Shown thereon are the B-channel bidirectional data paths B1 and B2, Ba, Bb and Bc, Bd, Be and Bf referred to in section B.1, above, designated 200, 202, 204 and 206, respectively, on FIG. 3. In addition, shown on FIG. 3 are three control busses 208, 210 and 212 which interconnect ports DA[7-0], DB[7-0] and MP1STRT[6-0], respectively of the MPI 100 with the ports DA[7-0], DB[7-0] and MP1STRT[6-0] of the LIU 110, the DLC 150, the receive/transmit filters 166 of MAP 160, and the MUX 170.

The contents of the MCR1, MCR2, and MCR3 registers determines the particular interconnection implemented on data busses 200, 202, 204 and 206, as described in Section B.1, above, in accordance with Table I. The manner in which the user programs the MCR1, MCR2, and MCR3 registers, as well as the other user-accessible registers within the DSC 34 is described in Section C, below.

As shown in FIG. 3, an analog-to-digital (A/D) 162 section of MAP 160 is connected to the DSP section 166 of MAP 160 by a bus 214, and a digital-to-analog (D/A) 164 section to the filters 166 by a bus 216. A D-channel bidirectional data path 218 interconnects LIU 110 and DLC 150 and a D-channel bidirectional data path 220 interconnects DLC 150 and MPI 100.

C. The Microprocessor Interface

Figure 4A:
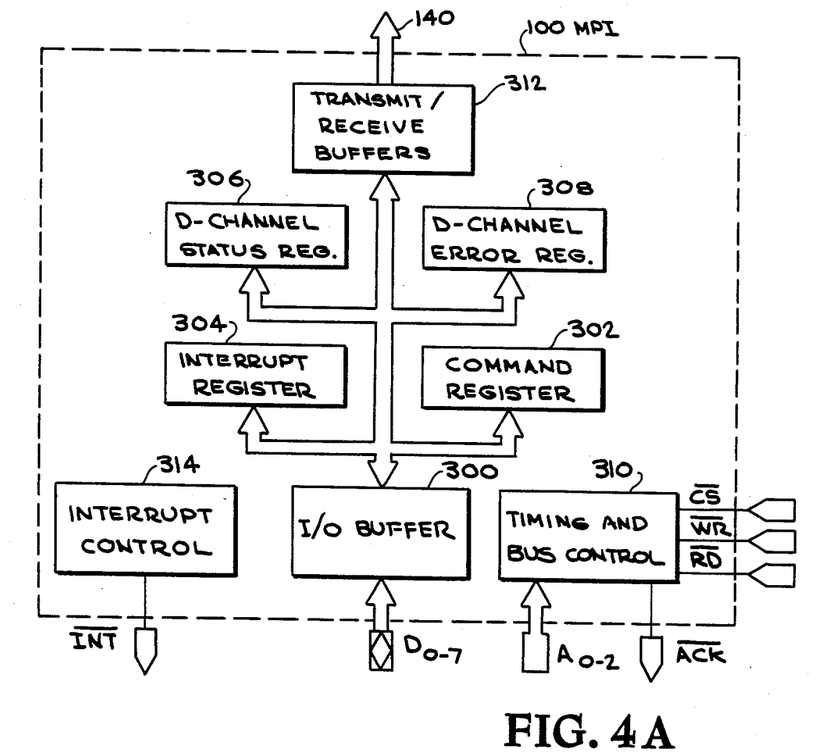
FIG. 4A is a block diagram of the microprocessor interface portion of the DSC.

The DSC 34 includes a number of programmable registers and filters which can be accessed via the microprocessor interface (MPI) 100. FIG. 4A illustrates the internal structure of the MPI 100, which includes an input/output (I/O) buffer 300, and command register (CR) 302, an interrupt register (IR) 304, D-channel status register (DSR) 306 and D-channel error register (DER) 308. The CR 302, IR 304, DSR 306 and DER 308 are user-accessible via the D[0-7] terminals of the DSC 34 and the I/O Buffer 300.

A detailed description of the related registers within the MPI 100 can be had by reference to the related, co-pending application entitled "Digital Subscriber Controller", referred to above, which description is hereby incorporated by reference.

Figure 4B:
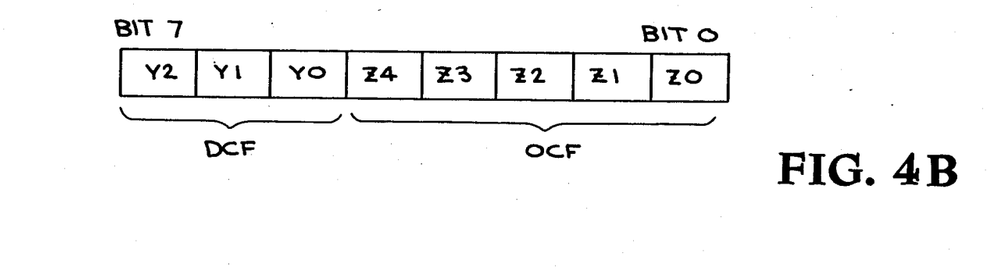
FIG. 4B illustrates the meaning associated with the contents of the command register within the microprocessor interface.

The CR 302 consists of an eight-bit register as shown in FIG. 4B. The CR 302 is subdivided into a three-bit (Y2, Y1, Y0) field containing the destination code field (DCF) and a five-bit (Z4, Z3, Z2, Z1, Z0) field containing the operational code field (OCF). The "Y" bits of the DCF define which section of the DSC 34 is to be accessed by the user via the MPI 100, in accordance with Table II, below. The "Z" bits of the OCF define which Data Register(s) within the section of the DSC 34 specified by the DCF of the eight-bit contents of the command register, in accordance with Table III, below.

Table III refers to a number of registers which do not reside in the MPI 100 section of the DSC 34. The transmit (X), receive (R), gain transmit (GX), gain receive (GER), and side tone gain are programmable filters with user-programmable gains within the receive/transmit filter section 166 of the MAP 160. The frequency tone generator registers (FTGR) 1 and 2, the amplitude tone generator registers (ATGR) 1 and 2 are associated with the user-programmable tone generators within the receive/transmit filter section of the MAP. MAP Mode registers (MMR) 1 and 2 are user-programmable registers within the receive/transmit filter section providing user-access to the tone generators and other user-selectable MAP functions. All of these elements as well as the elements to be described directly below, are discussed hereinafter in connection with the section of the DSC 34 which contains them.

TABLE II

| Destination Code Field of Command Register | | | |
|---|---|---|---|
| DCF | | | |
| Y2 | Y1 | Y0 | DSC Section |
| 0 | 1 | 0 | MUX 170 |
| 0 | 1 | 1 | MAP 160 |
| 1 | 0 | 0 | DLC 150 |
| 1 | 0 | 1 | LIU 110 |

TABLE III

| | Operational Code Field of Command Register | | | | | | |
|---|---|---|---|---|---|---|---|
| DSC Portion | Z4 | Z3 | Z2 | Z1 | Z0 | Filters and/or Data Register(s) Accessed | Bytes Transferred |
| INIT | 0 | 0 | 0 | 0 | 1 | Read/Write INIT register | 1 |
| LIU 110 | 0 | 0 | 0 | 0 | 1 | Read LSR | 1 |
| LIU 110 | 0 | 0 | 0 | 1 | 0 | Read/Write LPR | 1 |
| LIU 110 | 0 | 0 | 0 | 1 | 1 | Read/Write LMR1 | 1 |
| LIU 110 | 0 | 0 | 1 | 0 | 0 | Read/Write LMR2 | 1 |
| LIU 110 | 0 | 0 | 1 | 0 | 1 | Read/Write LPR, LMR1-2 | 3 |
| MUX 170 | 0 | 0 | 0 | 0 | 1 | Read/Write MCR1 | 1 |
| MUX 170 | 0 | 0 | 0 | 1 | 0 | Read/Write MCR2 | 1 |
| MUX 170 | 0 | 0 | 0 | 1 | 1 | Read/Write MCR3 | 1 |
| MUX 170 | 0 | 0 | 1 | 0 | 0 | Read/Write MCR4 | 1 |
| MUX 170 | 0 | 0 | 1 | 0 | 1 | Read/Write MCR1-4 | 4 |
| MAP 160 | 0 | 0 | 0 | 0 | 1 | Read/Write X Filter Coeffs | 16 |
| MAP 160 | 0 | 0 | 0 | 1 | 0 | Read/Write R Filter Coeffs | 16 |
| MAP 160 | 0 | 0 | 0 | 1 | 1 | Read/Write GX Filter Coeffs | 2 |
| MAP 160 | 0 | 0 | 1 | 0 | 0 | Read/Write GR Filter Coeffs | 2 |
| MAP 160 | 0 | 0 | 1 | 0 | 1 | Read/Write GER Filter Coeffs | 2 |
| MAP 160 | 0 | 0 | 1 | 1 | 0 | Read/Write Sidetone Gain | 2 |
| MAP 160 | 0 | 0 | 1 | 1 | 1 | Read/Write TGR 1 and 2 | 2 |
| MAP 160 | 0 | 1 | 0 | 0 | 0 | Read/Write ATGR 1 and 2 | 2 |
| MAP 160 | 0 | 1 | 0 | 0 | 1 | Read/Write MMR 1 | 1 |
| MAP 160 | 0 | 1 | 0 | 1 | 0 | Read/Write MMR 2 | 1 |
| MAP 160 | 0 | 1 | 0 | 1 | 1 | Read/Write all MAP Filter Coeffs/Registers | 46 |
| DLC 150 | 0 | 0 | 0 | 0 | 1 | Read/Write three 1st Receive Byte Registers | 3 |
| DLC 150 | 0 | 0 | 0 | 1 | 0 | Read/Write three 2nd Receive Byte Registers | 3 |
| DLC 150 | 0 | 0 | 0 | 1 | 1 | Read/Write Transmitter Address Register | 2 |
| DLC 150 | 0 | 0 | 1 | 0 | 0 | Read/Write three D-channel Record Byte Count Register | 6 |
| DLC 150 | 0 | 0 | 1 | 0 | 1 | Read/Write D-channel Trans Byte Count Register | 2 |
| DLC 150 | 0 | 0 | 1 | 1 | 0 | Read/Write DMR1 | 1 |
| DLC 150 | 0 | 0 | 1 | 1 | 1 | Read/Write DMR2 | 2 |
| DLC 150 | 0 | 1 | 0 | 0 | 0 | Read/Write all DLC except RNG Registers | 18 |
| DLC 150 | 0 | 1 | 0 | 0 | 1 | Read Receive Byte Count Reg | 2 |
| DLC 150 | 0 | 1 | 0 | 1 | 0 | Read/Write lsb of RNG | 1 |
| DLC 150 | 0 | 1 | 0 | 1 | 1 | Read/Write msb of RNG | 1 |

D. Main Audio Processor

The DSC 34 includes the MAP 160 of the present invention, consisting of a transmit section which converts the received analog audio signal to digital signals and a receive section which converts the received digital signals to analog audio signals. The MAP 160 contains a number of user-accessible registers which permit MPC control of the signal processing performed within the MAP 160.

D.1 The MAP Transmit Section

Figure 5A:
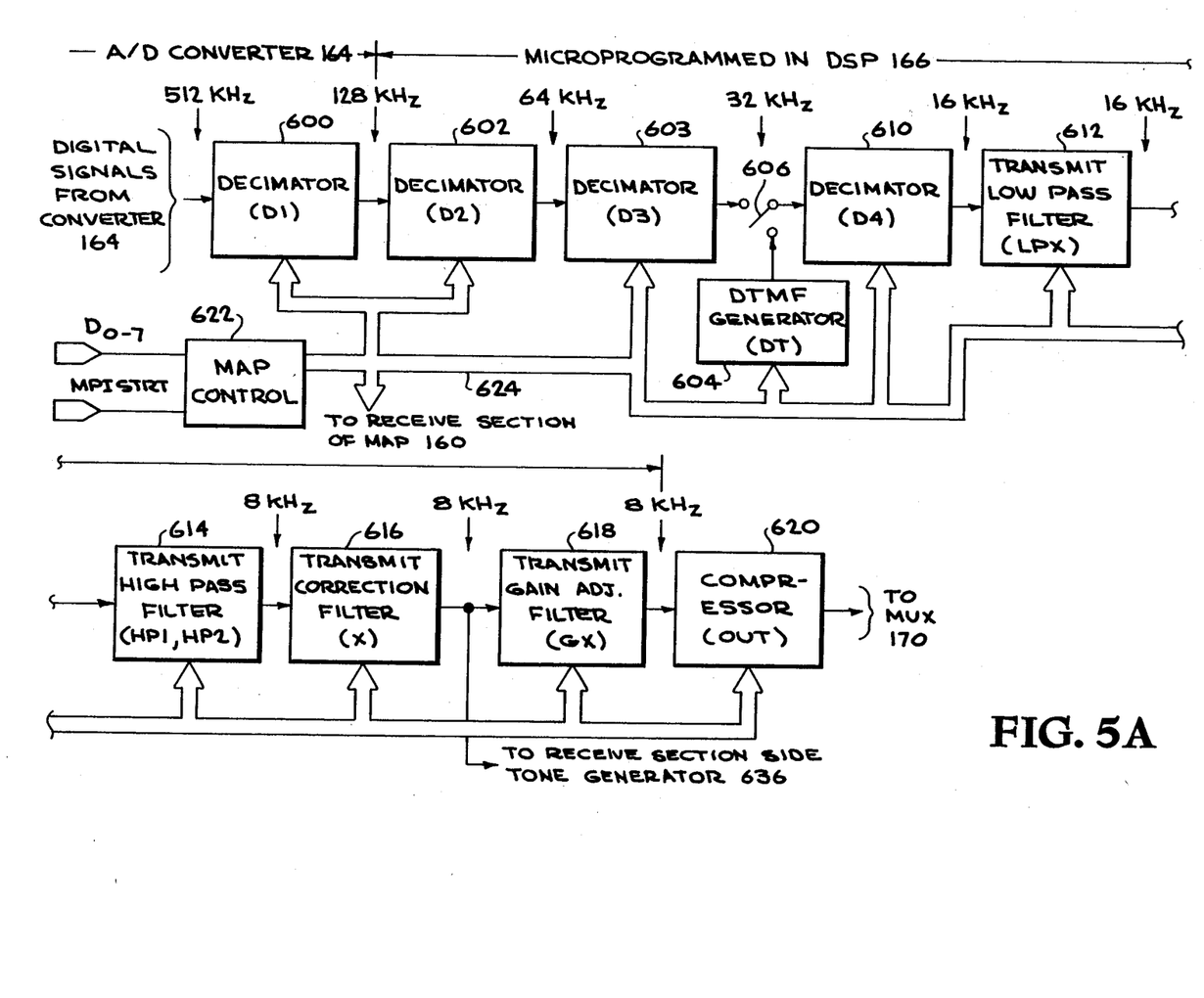
FIG. 5A illustrates the signal flow through the transmit section of the MAP.

Processing of data by the MAP transmit section is illustrated in the signal flow diagram of FIG. 5A. The 512 kilo-cycles per second (KHz) digital signals received from the A/D converter 164 are applied to a decimator (D1) 600 which reduces the sampling frequency to 128 KHz. The resulting 128 KHz digital signals are applied to a second decimator (D2) 602, which reduces the sampling frequency to 64 KHz. A third decimator (D3) 603 receives the 64 KHz generated by decimator 604, and generates therefrom a 32 KHz signal. A user-programmable dual tone multi-frequency (DTMF) generator (DT) 604 which can be enabled via a MAP mode register, as described below, is one of three tone generators included in the MAP 160. The DTMF generator 604 can be used to generate a signal consisting of one or two tones in which the frequency, amplitude and cadence of the tone is programmable via the MPC. The tone(s) can be routed into the 32 KHz signal generated at the output of decimator 603 at a two-way switch 606. One pole of the switch 606 is connected to the output of the third decimator 603. The second pole of switch 606 is connected to the DTMF generator 604. The arm of switch 606 is connected to the fourth decimator 610. The signals generated by decimator 603, including the signal from the DTMF generator 604, are conducted to a fourth decimator (D4) 610 which reduces the sampling frequency to 16 KHz. A transmit low pass filter (LPX) 612 and high pass filter (HP1, HP2) 614 acting in series on the 16 KHz signal generated by the fourth decimator 610 produce an 8 KHz applied to a user-programmable transmit attenuation distortion correction eight-tap FIR filter (X) 616.

The transmit correction filter 616 can be programmed to modify the frequency characteristics in the MAP transmit section to compensate for the characteristics of the microphone or other transducer connected to the AINA, AINB and AGND terminals of the DSC 34. The filter 616 can also be programmed to add pre- and/or post-emphasis to match other characteristics desired by the user.

The corrected signals generated by the transmit correction filter 616 are conducted to a user-programmable transmit gain adjustment filter (GX) 618, and therefrom to a compressor (OUT) 620. The compressor 620 employs a digital compression algorithm which implements either a Mu-law or an A-law conversion on the linear digital data. The resulting compressed signal is conducted to the MUX 170 via signal lines 202. (FIG. 3). The transmitted signals are available at the output of the transmit correction filter 616 for introduction into the MAP receive section, as will be described below.

A MAP control 622 provides access to elements of the MAP 160 via internal bus 624 through the MPI 100, as well as to supply timing and signal processing signals to the elements of MAP 160. The filter timing signals produced by MAP control 622 are illustrated in FIG. 5B. A total of 512 clock cycles are used by DSP 166 to execute the various transmit-side and receive-side functions shown in FIGS. 5A and 5C, below. Each function is allocated the particular sequence of cycles shown in FIG. 5B indicated by the acronym of the function used on FIGS. 5A and 5C.

D.2 The MAP Receive Section

Figure 5C:
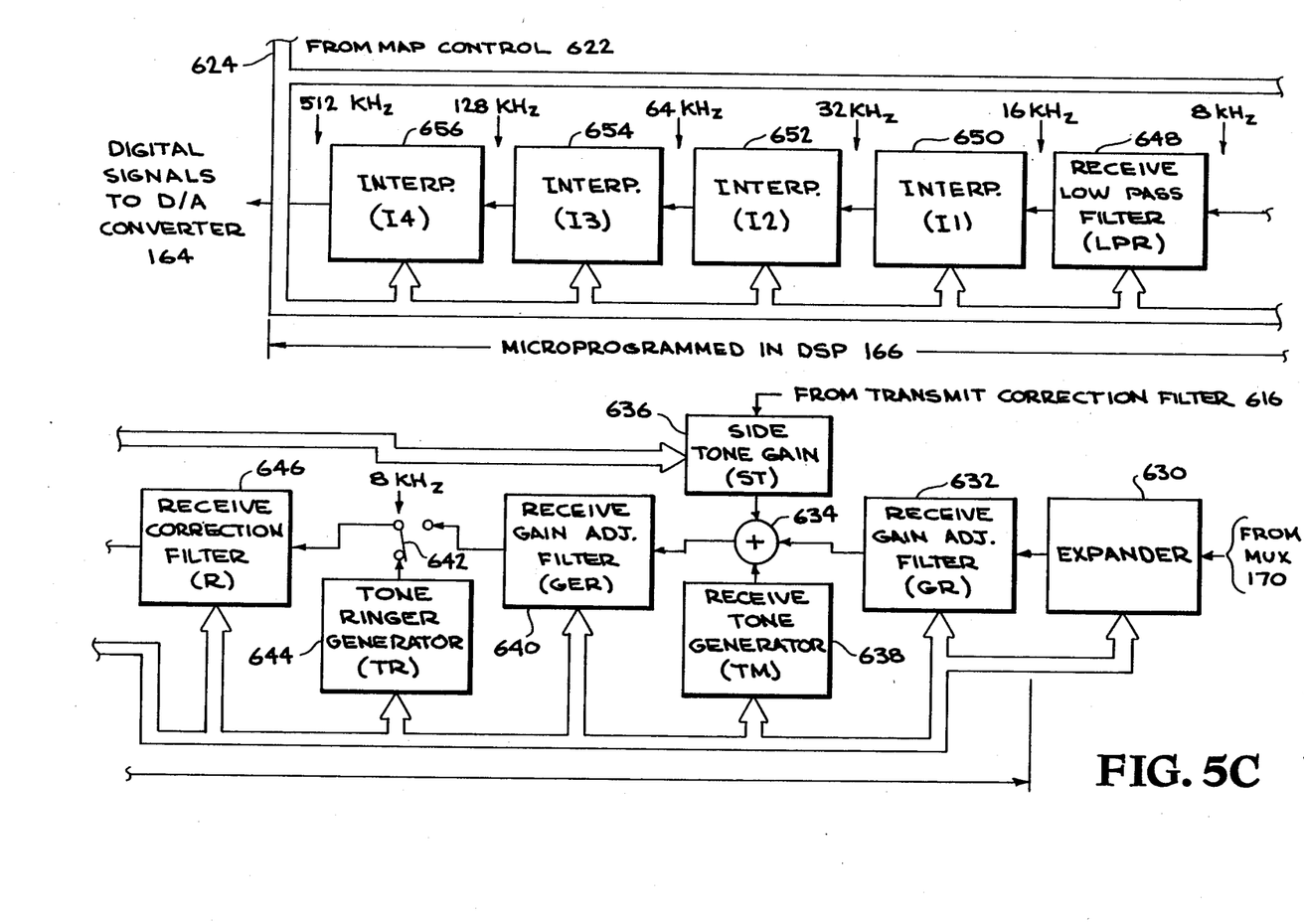
FIG. 5C illustrates the signal flow through the receive section of the MAP.

FIG. 5C illustrates signal flow in the receive section of MAP 160. Signals from the MUX 170 are received by an expander 630 which performs a Mu-law, or an A-law-to-linear conversion. The resulting linear digital signals are conducted to a receive gain adjustment filter (GR) 632 and therefrom to a summer 634.

A programmable side tone generator (ST) 636 connected to the output of the transmit correction filter 616, permits the transmitted signals to be introduced into the MAP receive section at the summer 634 to which the side tone generator is connected. A tone message generator (TM) 638 is also connected to summer 634.

The output of summer 634 is applied to a second programmable receive gain adjustment filter (GER) 640, the output of which is connected to one pole of a software-controllable switch 642. The second pole of the switch 642 is connected to the output of a tone ringer generator (TR) 644. The signals generated by side tone generator 636 can be used to add a portion of the transmitted signal to the receive channel. The signals generated by the tone message generator 638 and the tone ringer generator 644 can be used as ringing tones, busy signals, ringback tones or other call progress tones. The arm of switch 642 is connected to a user-programmable receive attenuation distortion correction eight-tap FIR filter (R) 646.

The resulting corrected 8 KHz signal is conducted to a receiver low pass filter (LPR) 648 and therefrom to a series of four interpolation filters (I1), (I2), (I3) and (I4), 650, 652, 654 and 656 to increase the sampling frequency to 256 KHz. The output from the last interpolation filter 656 is transmitted to the D/A converter 162 (FIG. 1) of MAP 160. The filter timing signals shown in FIG. 5B control the execution of the various receive-side functions shown in FIG. 5C as described above in connection with the transmit-side functions.

The three programmable MAP tone generators 604, 638 and 644 can be programmed with two frequency values and two amplitude values stored in two eight-bit bytes of a frequency tone generator register (FTGR) and two eight-bit bytes and an amplitude tone generator register (ATGR). A second MAP mode register (MMR2) is an eight-bit register whose contents enable certain of the tone generators as will now be described. The contents of the FTGR correspond to a frequency between 300 and 3000 Hz, the contents of the ATGR correspond to an amplitude between 0 and −18 db in 2 db steps.

D.3 MAP Registers

The MAP 160 transmit and receive sections contain the eight sets of user-programmable registers listed in Table IV, below. These registers are enabled or disabled in accordance with the contents of two MAP mode registers (MMR1 and MMR2) as described in Table V, below. The user-programmable filter coefficients referred to in the first six rows of Table IV are stored in the MAP coefficient random access memory (RAM) upon reception of data from the MPC via MPI 100. Alternatively, default values are stored in a MAP programmable logic array (PLA).

TABLE IV

| MAP Programmable Registers | | |
|---|---|---|
| Register Name | Bytes Stored | Default Values |
| Transmit Correction Filter (616) Coefficients | 16 | 0 db flat |
| Receive Correction Filter (646) Coefficients | 16 | 0 db flat |
| Transmit Gain Adj. Filter (618) Coefficients | 2 | 0 db |
| Receive Gain Adj. Filter (632) Coefficients | 2 | 0 db |
| Receive Gain Adj. Filter (640) Coefficients | 2 | 0 db |
| Sidetone Gain (636) | 2 | −18 db |
| Frequency Tone Generator | 2 | 0 |
| Amplitude Tone Generator | 2 | 0 |

TABLE V

| | MAP Mode Registers MMR1 and MMR2 | |
|---|---|---|
| Bit | If Content is: | |
| Position(s) | Logical ONE | Logical ZERO (Default) |
| MMR1[0] | A-law conversion | Mu-law conversion |
| MMR1[1] | Transmit Gain Adj. Filter Coeff from RAM | Transmit Gain Adj. Filter Coeff from ROM = 0 db |
| MMR1[2] | Receive Gain Adj. Filter (632) Coeff from RAM | Receive Gain Adj. Filter (632) Coeff from ROM = 0 db |
| MMR1[3] | Recieve Gain Adj. Filter (640) Coeff from RAM | Receive Gain Adj. Filter (640) Coeff from ROM = 0 db |
| MMR1[4] | Transmit Correction Filter (616) Coeff from RAM | Transmit Correction Filter (616) Coeff from ROM = 0 db |
| MMR1[5] | Receive Correction Filter (646) Coeff | Receive Correction Filter (646) Coeff from ROM = 0 db |
| MMR1[6] | Sidetone Gain (636) Disable | Sidetone Gain (636) = 18 db |
| MMR1[7] | Digital loopback at MAP Enable | Digital loopback at MAP Disable |
| MMR2[0] | AINB terminal enabled | AINA terminal enabled |
| MMR2[1] | LS1 and LS2 terminals enabled | EAR 1 and EAR 2 terminals enabled |
| MMR2[2] | DTMF Generator (604) enabled | DTMF Generator (604) disabled |
| MMR2[3] | Receive Tone Generator (638) | Receive Tone Generator (638) disabled |

TABLE V-continued

| | MAP Mode Registers MMR1 and MMR2 | |
|---|---|---|
| Bit | If Content is: | |
| Position(s) | Logical ONE | Logical ZERO (Default) |
| | enabled | |
| MMR2[4] | Tone Range Generator (644) | Tone Range Generator (644) disabled |
| MMR2[5] | Transmit High Pass Filter (614) Filter enabled | Transmit High Pass Filter (614) disabled |
| MMR2[6] | A/D Converter (164) zero offset disabled | A/D Converter (164) zero offset enabled |
| MMR2[7] | Not used | Not used |

E. MAP 160 Architecture

Figure 6:
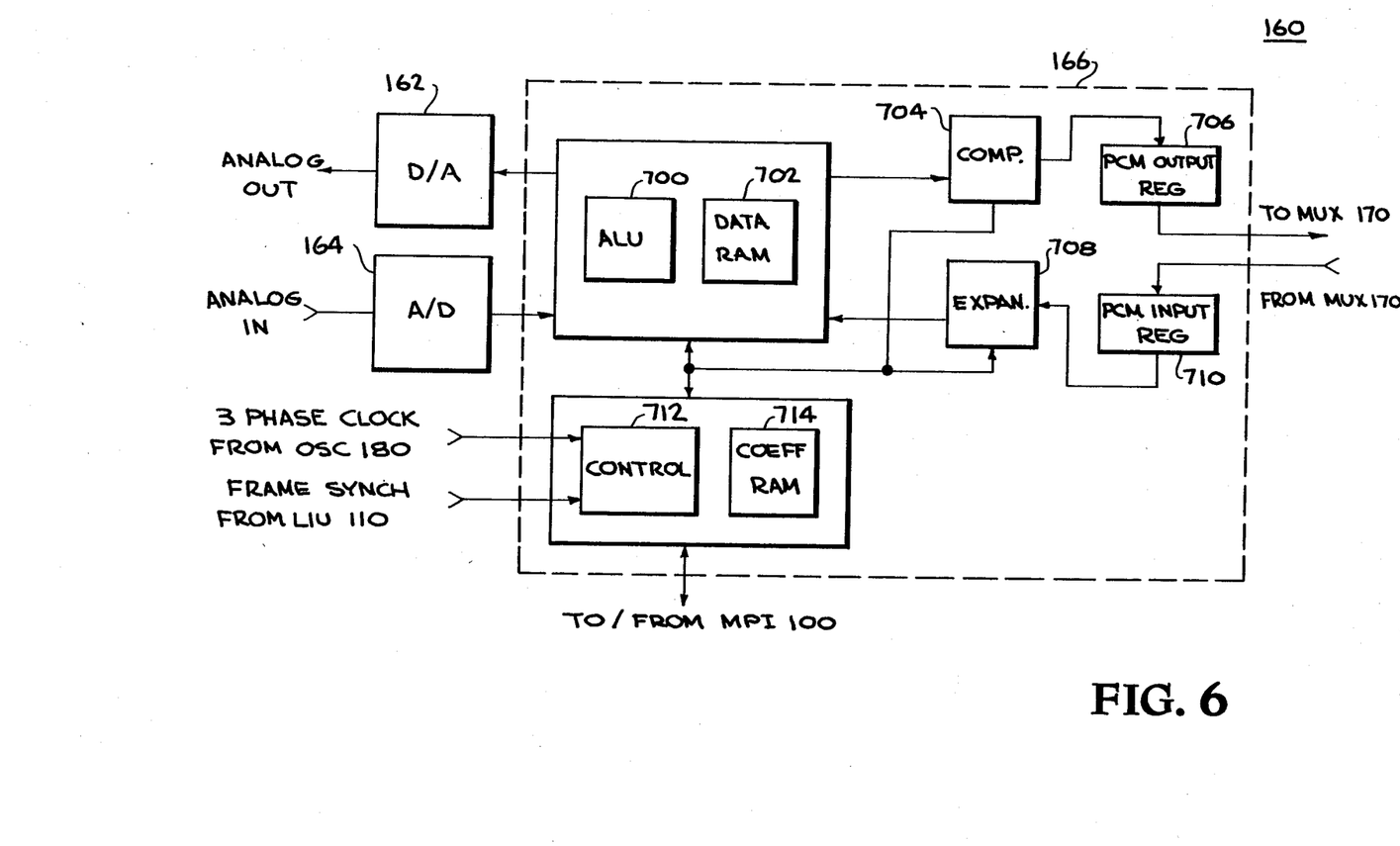
FIG. 6 illustrates the architecture of the DSP of the instant invention.

An overview of the architecture internal to MAP 160 is shown in FIG. 6. As shown, an arithmetic logic unit (ALU) 700 with its associated random access memory (RAM) 702 is contained within the digital signal processing (DSP) block 166. Data representing signals received from A/D converter 164 or transmitted to D/A converter 162 are temporarily stored within the RAM 702 and digitally processed by the ALU 700. A compressor 704 (620 in FIG. 5A) performs the Mu-law or A-law conversion of the digital signals generated by the ALU 700 and the resulting compressed signal is stored in a PCM output register 706 and conducted therefrom to the MUX 170. An expander 708 (630 in FIG. 5C) receives the digital signals from MUX 170 via a PCM input register 710 and performs the mu-law or A-law conversion and conducts the resulting linear digital signals to the ALU 700 for signal processing.

A control section 712 (622 in FIG. 5A) of the DSP block 166 generates control signals to the ALU 700, the data RAM 702, the compressor 704 and the expander 708. The control 712 has an associated random access memory (RAM) 714 for storing the user-progammable numerical coefficients used by the ALU 700 during processing of the signals.

Figure 7:
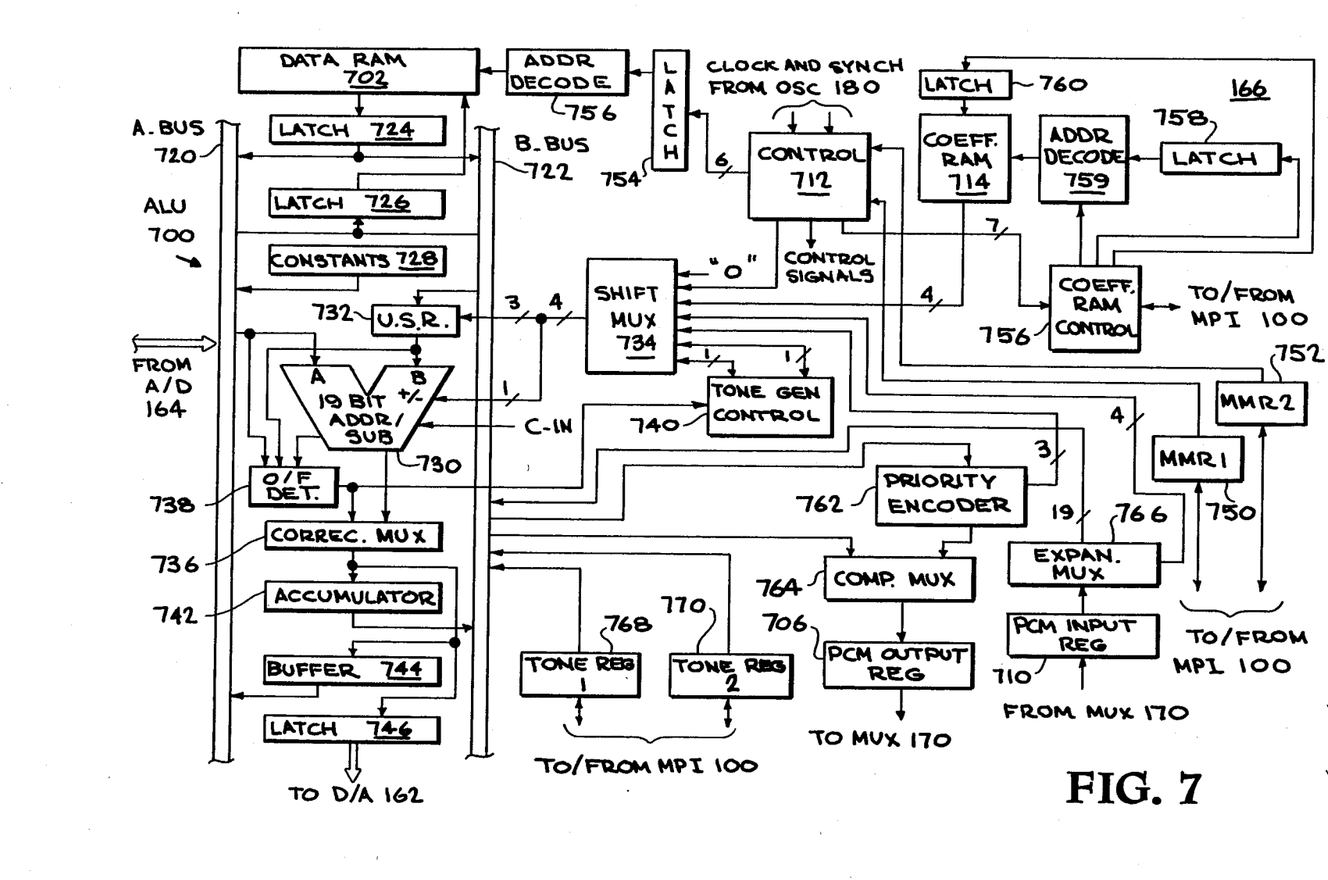
FIG. 7 is a block diagram of the DSP of the instant invention.

With reference to FIG. 7, the DSP section 166 of MAP 160 includes the data RAM 702, the PCM output and input registers 706 and 710, control 712, and the coefficient RAM 714 discussed in connection with FIG. 6. The ALU 700 section of DSP 166 is shown in greater detail in FIG. 7 as including a pair of bidirectional 19-conductor busses; an A bus 720 and a B bus 722. The data RAM 702 is connected to the A and B busses via an output latch 724 and via an input latch 726. A register 728 which stores numerical constants is connected to the A bus 720. A 19-bit adder/substractor 730 has an A-side input connected to A bus 720 and a B-side input connected to B bus 722 via a shift register 732.

Adder/substractor 730 receives a carry-in (C_IN) signal and an add/substract (+/−) signal generated by a shift multiplexer 734. Shift multiplexer 734 also generates in parallel a 3-bit shift control signal which is received by the shift register 732. The resulting sum or difference of the 19-bit binary numbers corresponding to the signals received at the A and B input ports to adder/subtractor 730 is generated therein and conducted to a correction multiplexer 736. An overflow detector (O/F DET) 738 also receives the signals corresponding to the binary numbers received by the adder/subtractor 730 as well as a carry-out signals generated by adder/subtractor 730 and produces an overflow signal which is received by correction multiplexer 736 as well as by a tone generator control 740. In this manner ALU 700 performs so-called saturation arithmetic.

The corrected result of adding or subtracting the values of the A and B inputs to adder/subtractor 730 is generated by the multiplexer 738 and received by an accumulator 742. The contents of accumulator 742 is conducted to the B bus 722. The corrected result generated by multiplexer 738 is also conducted via a buffer 744 to the A bus 720 and via a latch to the D/A converter 162. The A/D converter 164 is connected to the ALU 700 via A bus 720.

Control 712 receives via MPI 100 and MAP mode registers (MMR1) 750 and (MMR2) 752 the signals generated by the MPC which enable/disable and control the contents of the eight sets of user-programmable registers within the MAP 160. Control signals are generated by control 712 in accordance with the contents of MMR1 750 and MMR2 752 as well as the clock and frame synchronization signals received from OSC 180 which are received by the various elements of the DSP 166 shown in FIG. 7. However, many of the lines conducting these signals are not explicitly shown in FIG. 7 nor are all these signals described herein as generally the nature and distribution of such signals are well-known to those skilled in the art. Control 712 generates in parallel a six-bit address which is received by a latch 754 which is decoded by address decoder 759 and the contents at the specified address is accessed in data RAM 702 during data read and write operations. Similarly, a coefficient RAM control 756 generates in response to a signal received from control 712 in parallel a 7-bit address which is received by a latch 758 which is decoded by an address decoder 759 and the contents of the specified address is accessed in coefficient RAM 714. Numerical coefficient data is received from MPI 100 and conducted via control 756 and a latch 760 and stored within coefficient RAM 714 at the specified address. Alternatively, numerical coefficient data may be read from coefficient RAM 714 at the specified address and conducted in parallel on a 4-bit signal line to the shift multiplexer 734. Control 712 may generate in parallel on a 4-bit signal line coefficient data which is conducted to the shift multiplexer 734. Tone generator control 740 generates on a pair of 1-bit signal lines signals which are received by the shift multiplexer 734, as will be described below.

A priority encoder 762 connected to B bus 722 generates in parallel on a 3-bit signal line signals also received by shift multiplexer 734. A compression multiplexer 764 is connected to priority encoder 762 and to the B bus 722 and generates a time-division multiplexed signal therefrom which is received by the PCM output register 706. The PCM input register 710 is connected to an expansion multiplexer 766 which generates in parallel on a 4-bit signal line signals received by the shift multiplexer 734 and generates in parallel on a 19-bit conductor signals to the B bus 722. Register 710 and multiplexer 766 together perform the expander operation labelled 630 in FIG. 5C.

The shift multiplexer 734 also receives a signal corresponding to a binary ZERO, and in response to a 3-bit shift register control signal generated in parallel by control 712, one of the signals received by the multiplexer 734 is conducted to the adder/subtractor 730 and the shift register 732, in accordance with Table VI, below.

TABLE VI

| Shift Register Control Signal | Origin of Numerical Coefficients |
|---|---|
| | Origin |
| 0 0 0 | Control 712 |
| 0 0 1 | Coefficient RAM 714 |
| 0 1 0 | Expander MUX 766 |
| 0 1 1 | Priority Encoder 762 |
| 1 0 0 | Tone Register 1 (Sign Only, Shift = 16) |
| 1 0 1 | Tone Register 1 (Sign Only, Shift = 0 |
| 1 1 0 | Tone Register 2 (Sign Only, Shift = 16 |
| 1 1 1 | Accumulator 742 (Sign Only, Shift = 0) |

A tone register 1 768 and a tone registers 2 770, referred to in Table VI, above, receive the user-selected tone coefficient signals generated by the external microprocessor (MPC) via the MPI 100 and these signals are conducted therefrom to the B bus 722. These registers together with tone generator control 740 perform the DTMF, tone ringer, and tone message generation operations labelled 604, 644 and 638 in FIGS. 5A and 5C. During a tone generation operation, the contents of tone register 1 and 2 are conducted via the B bus 722 and the shift register 732 to the B input part of the adder/subtractor 730 under control of the 3-bit parallel signals generated by the shift multiplexer 734 and received by the shift register 732, in accordance with Table VI, above.

The dual-bus design of the DSP 166 and the bit-sliced structure of the various elements shown in FIG. 7 connected to the A and B busses 720 and 722, are the subject of the related copending application entitled "Bit-Sliced, Dual-Bus Design of Integrated Circuits", which is incorporated by reference.

F. Operation of the DSP 166

A so-called COEFF variable which will be used in the description of the operation of the DSP 166 shown in FIG. 7, reflects the number of right shifts to be performed by shift register 732 as well as the state of the add/subtract signal received by adder/subtractor 730. As such, the COEFF variable represents the 4-bit parallel signals generated by shift multiplexer 734 of which a 3-bit parallel portion is received by the shift register 732 which determines the number of right shift to be performed thereby and a 1-bit portion is received by the adder/subtractor 730 which determines whether an addition or a subtraction is to be performed thereby.

At the A input port, the adder/subtractor 730 can select one of the following as a source: the buffer 744, the data RAM output latch 724, or the constants register 728. Selection is performed by the A bus 720 which acts as a multiplexer which is responsive to control signals generated by control 712. Similarly, at the B input port, the B bus 722 can select one of the following as a source: the accumulator 742, the data RAM output latch 724, the expander multiplexer 766, the tone register 1 768, the tone register 2 770, or the constant "0".

The contents of a location within data RAM 702 selected by an address generated by control 712 and received at the address decoder 756 via latch 754, can be read to the data RAM output latch 724. The contents of a selected location within data RAM 702 can be written via either the A-bus 720 or B-bus 722 from the following sources: accumulator 742, buffer 744, decimator 600 (FIG. 5A), data RAM output latch 724, or the constant "0".

During the first phase of the 3-phase clock generated by OSC 180, the contents of one of the following sources is placed onto the A bus 720: data RAM output latch 724, the constant "0", or the buffer 744. During the second phase of the 3-phase clock, the contents of one of the following sources is placed onto the A bus 720: the constant "0", the decimator 600, or the buffer 744. During the first phase of the 3-phase clock, the contents of one of the following sources is placed onto the B bus 722: the constants register 728, the data RAM output latch 724, the expander multiplexer 766, or the accumulator 742; and during the second phase: the accumulator 742, or the data RAM output latch 724.

Figure 8:
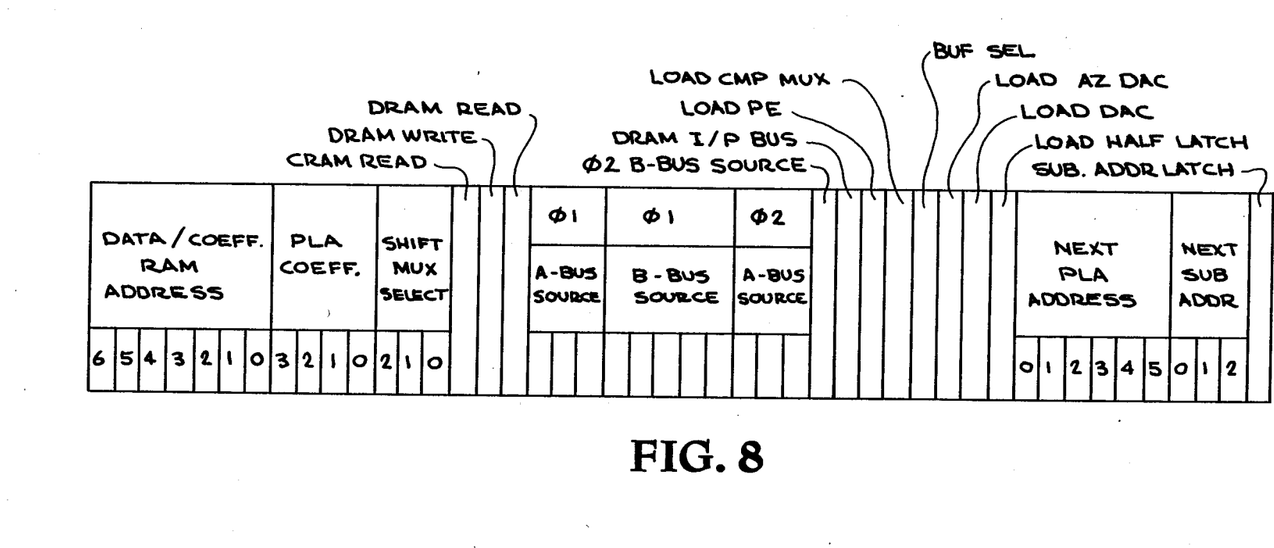
FIG. 8 illustrates the format of the microcoded instructions controlling the DSP.

The above-referenced operations are controlled by DSP control 712 during execution of a series of microcode instructions, each having the format illustrated in FIG. 8. These instructions are stored within the programmable logic array (PLA) section of the control 712, not shown. With reference to FIG. 8, each instruction comprises a 46-bit word. The most-significant seven bit positions containing the address of a location to be accessed in either the data RAM 702 or the coefficient RAM 714, the former RAM ignoring the most-significant of these seven bits. The next most-significant four bit positions of the instruction word contain the value of a numerical coefficient used in the programmable and non-programmable filters of the MAP 160. The next-most-significant three bit positions contain the shift register 732 control values referred to in Table VI, above. The next-most-significant three bit positions contain a coefficient RAM 714 read enable flag, a data RAM 702 write enable flag and a data RAM 702 read enable flag, respectively.

The twelve next-most-significant bit positions of the instruction word illustrated in FIG. 8 contain values indicating the A bus 720 and B bus 722 sources, described above. The next-most-significant bit position contains a value specifying which bus, A or B, is to be used to load the contents of the data RAM input latch 726. The next-most-significant bit position contain a flag indicative of whether A-law or Mu-law encoding is to be performed for use by the priority encoder 762. The next-most-significant bit positions contain a flag which enables loading of the compressor multiplexer 764, a flag which enables loading of the buffer 744, a flag which enables an auto-zero (AZ) corrector within the A/D converter 164, a flag which enables loading of the D/A converter 162, and a flag which enables loading of a half latch buffer connected to the D/A converter 162.

The next-most-significant six bit positions contain the address of the next instruction to be executed by control 712, and the next-most-significant three bit positions specify which of eight time-slots are to be assigned to the execution of the instruction. The least-significant bit position of the instruction word contains a flag which enables loading of the three time-slot bit positions into a latch internal to control 712.

The DSP control 712 executes a series of the instructions shown in FIG. 8 each of which causes one or more of the following operations to take place:

ACC, <BUF>=COEFF * ADATA+BDATA <R> XXX and

<W(A, B, L, D, O)> XXX.

In the first operation concerning the accumulator (ACC) 742 and, optionally, the buffer (BUF) 744, ADATA can be the contents of the accumulator 742, the data RAM output latch 724, the expander multiplexer 766, the tone registers 1 and 2 768 and 770, or the constant "0". The source of COEFF can be the control 712, the coefficient RAM 714, the expander multiplexer 766, the priority encoder 762, the tone registers 1 and 2 768 and 770, or the accumulator 742. BDATA can be the contents of buffer 744, the data RAM output latch 724, or the constants register 728. The buffer register 744 can be optionally selected, in addition to the accumulator register 742 which is always used, to store the results of the operation.

The second operation <R> is an optional storage of the contents of the data RAM 702 at location XXX into data RAM output latch 724, and the third operation concerns an optional storage into the data RAM 702 at location XXX from one of the following: the accumulator (A) 742, the buffer (B) 744, the decimator (D) 600, the data RAM output latch (L) 724, or the constant "0".

G. Tone Generation

Illustrative of the versatility of the DSP 166 of the instant invention is its generation of single tones and dual-tone multi-frequency (DTMF) signal. The frequency, amplitude and cadence of tone generated are determined by the user and selected by appropriate storage of various parameters in the programmable registers of the DSP 166 via the MPI 100. These tones can also be used by the DSC 34 for tone message and tone ringer functions.

Briefly, a triangular wave is produced by repetitively adding a user-supplied "delta" value to the contents of accumulator 742 until a positive overflow condition is detected by overflow detector 738. The delta value is then subtracted until a negative overflow (underflow) condition is detected. The triangular waveform is multiplied by 1.5 and truncated at the overflow and underflow levels to produce a trapezoidal waveform. The factor 1.5 produces a 33% risetime in the waveform. Finally, a waveform with the desired tone volume is generated based upon a user-selected amplitude coefficient with which the trapezoidal waveform is multiplied.

The related, copending application Ser. No. 771,382, entitled "Tone Generation for Telecommunications" contains a detailed description of various aspects of tone generation by the DSP 166 of the instant invention, and is hereby incorporated by reference.

We claim:

1. A processor connected to a source of time-division multiplexed (TDM) digital signals, a destination of TDM digital signals and a dual PCM channel, having a central control responsive to signals received from an external device, said central control cyclically processes instructions and generates control signals therefrom, said processor further comprising:
    an arithmetic logic unit (ALU) responsive to said control signals;
    a first bidirectional data bus connected to said ALU and said source of TDM digital signals; and
    a second bidirectional data bus connected to said ALU and said PCM channel;
    whereby said TDM signals are received from said source by said ALU via said first data bus and processed by said ALU in response to said signals received from said external device and transmitted by said ALU via said second data bus over said dual PCM channel.

2. A digital signal processor according to claim 1 wherein said ALU includes adder/subtractor means responsive to an add/subtract signal having a first and a second input for selectively generating at an output signals representing the sum or the difference of two numbers from signals applied to said inputs representing said numbers; and overflow detection means responsive to said signals representing said numbers and to a carry-out signal generated by said adder/subtractor means for generating an overflow signal, said processor further including:
    means responsive to said control signals and to said signals from said external device for storing and generating signals corresponding to coefficient values;
    means responsive to said overflow signal for generating a plurality of tone control signals;
    means responsive to a shift control signals connected to said second data bus, for selectively down-shifting a plural-bit quantity represented by signals received via said second data bus and generating at an output signals representative of said downshifted quantity; and
    multiplexer means connected to said control, said coefficient storage and generation means, said dual PCM channel, said second data bus, and said tone control generation means, for selectively generating therefrom said add/subtract signal and said shift control signal.

3. A digital signal processor according to claim 2 further including first and second tone register means each having an output connected to said second data bus, each connected to said external device for receiving and storing signals representative of first and second tone control parameters, respectively, and generating therefrom said tone control signals onto said second data bus.

4. A digital signal processor according to claim 3 wherein said tone control signals include signals representative of a frequency value, and an amplitude value.

5. A digital signal processor according to claim 2 further including first mode register means having an output connected to said central control, connected to said external device for receiving and storing signals representative of predetermined ones of said coefficient values and generating therefrom said filter coefficient values.

6. A digital signal processor according to claim 2 wherein said processor performs a plurality of digital signal processing functions and is responsive to processing function enablement signals further including second mode register means having an output connected to said central control, connected to said external device for receiving and storing signals representative of enablement and disablement of predetermined ones of said digital signal processing functions and generating therefrom said processing function enablement signals.

7. A digital signal processor according to claim 2 wherein said ALU includes a plurality of circuit elements each performing parallel operations on a predetermined one of said TDM signals, each said circuit element assigned a predetermined time-division slot of at least one of said busses and each said circuit element comprises a plurality of subelements each connected to a predetermined one of the conductors of said at least one bus.

8. A digital signal processor according to claim 7 wherein predetermined ones of said subelements of a circuit element are replicated.

9. A digital signal processor according to claim 7 responsive to a plural-phase clock signal wherein predetermined ones of said circuit elements are sources for a predetermined one of said busses during said predetermined time-division slots assigned to said circuit elements, and predetermined ones of said circuit elements are destinations for a predetermined one of said busses during said predetermined time-division slots assigned to said circuit elements.

* * * * *